United States Patent [19]

Edwards et al.

[11] 3,900,684

[45] Aug. 19, 1975

[54] METHOD OF FORMING A FLUOROCARBON POLYMER CONTAINING COATING ON A SUBSTRATE

[75] Inventors: John Wilmar Edwards, Welwyn Garden City; Barry William Farrant, St. Neots, both of England

[73] Assignee: Imperial Chemical Industries Limited, London, England

[22] Filed: June 4, 1973

[21] Appl. No.: 367,004

[30] Foreign Application Priority Data
June 9, 1972  United Kingdom............... 27011/72

[52] U.S. Cl.... 428/421; 427/409, 427/375, 427/376, 427/385; 260/29.6 F
[51] Int. Cl. .......................... C08f 3/24; B32b 15/08

[58] Field of Search... 117/132 CF, 72, 75, 161 UH, 117/161 UF, 97; 260/29.6 F; 423/629

[56] References Cited
UNITED STATES PATENTS

| | | | |
|---|---|---|---|
| 2,592,147 | 4/1952 | Ikeda | 260/29.6 F |
| 3,644,261 | 2/1972 | Strolle | 260/29.6 F |
| 3,697,309 | 10/1972 | Werner | 117/72 |

*Primary Examiner*—Ralph Husack
*Attorney, Agent, or Firm*—Cushman, Darby and Cushman

[57] ABSTRACT

Aluminum hydroxychloride is added as an adhesive to fluorocarbon polymer dispersions to form coating compositions useful e.g. for the manufacture of non-stick aluminum cookware.

9 Claims, No Drawings

METHOD OF FORMING A FLUOROCARBON POLYMER CONTAINING COATING ON A SUBSTRATE

This invention relates to fluorocarbon polymer compositions. In particular it relates to compositions including dispersions of fluorocarbon polymers in liquid media together with an adhesive. The invention also relates to methods of making such compositions and to methods of coating substrates using compositions in liquid media. It further relates to articles made from or made by use of the fluorocarbon polymer compositions.

According to this invention there is provided a fluorocarbon polymer composition including a fluorocarbon polymer and an aluminium hydroxychloride. Aluminium hydroxychloride may be represented by the formula

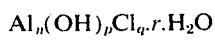

$$Al_n(OH)_pCl_q.r.H_2O$$

wherein $3n$ equals $p + q$, and $r$ is greater than or equal to zero. They may be made by known methods.

Liquid compositions according to the invention have been found useful in preparing fluorocarbon polymer-containing coatings on substrates. In particular, they may be used to produce such coatings on metals especially aluminium, for example polytetrafluoroethylene-containing coatings on metal cookware and a wide variety of other articles. It has been found that the aluminium hydroxychloride acts as a convenient, and inexpensive, adhesive or binder for the fluorocarbon polymer.

Compounds known as aluminium hydroxychloride can usually only be given an approximate formula. A preferred aluminium hydroxychloride for use in the invention has an approximate formula

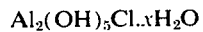

$$Al_2(OH)_5Cl.xH_2O$$

where $x$ is approximately 2. The material of this formula is commercially available under the name Aluminium Chlorohydrate.

In preparing a composition according to the invention, an adhesive solution may first be formed and subsequently blended with a fluorocarbon polymer dispersion.

By fluorocarbon polymers there are included polytetrafluoroethylene (PTFE) and copolymers of tetrafluoroethylene with up to 15% by weight of other monomers such as ethylene, vinyl chloride and hexafluoropropene. Preferred fluorocarbon polymers are PTFE and copolymers of tetrafluoroethylene with up to 5%, especially 0.05 to 2%, by weight of other monomers such as ethylene, vinyl chloride and hexafluoropropene. Such preferred polymers are subsequently referred to as "TFE resins".

Preferred compositions according to the invention include an aqueous dispersion of a TFE resin especially PTFE in which aluminium hydroxychloride has been dissolved or with which an aqueous solution of aluminium hydroxychloride has been blended. Preferred quantities of TFE resin per 100 g of composition are from 10 to 50 g especially 20 to 40 g. Preferred quantities of aluminium hydroxychloride are such that the weight of aluminium per 100 g of composition are 1 – 5 g. Preferably the weight of aluminium in the aluminium hydroxychloride per 100 g of TFE resin should be at least 3 g and a weight within the range 6 to 20 g especially 6 to 9 g is advantageously used.

The compositions may include other components such as pigments and fillers such as graphite.

A method according to the invention of coating a substrate comprises applying a composition as above set forth in a liquid medium to the substrate to form a coating, and heating the coating to remove the volatile components and form an adherent coating. More than one coat may be applied in this way. This method may be used e.g. for bonding the fluorocarbon polymer to metal surfaces e.g. aluminium surfaces.

When the composition includes an aqueous dispersion of a TFE resin as above defined, the coating may be dried to remove substantially all the volatile components of the coating and it may subsequently be sintered, preferably after the application to it of a top coat of an aqueous TFE resin dispersion not including an adhesive. By means of the sintering process, an adherent coating of TFE resin may be obtained on the substrate.

The aqueous compositions of the invention containing dispersed TFE resins may be applied as coatings to a variety of substrates, including glass, e.g. for non-stick oven ware and non-stick autoclave linings; ceramics; metal such as ferrous metals, for example cast iron, mild steel, stainless steel and aluminium and its alloys; and composite surfaces such as metals having a reinforcing coating, such as a sprayed ceramic, metal or metal + metal oxide coatings produced e.g. by flame spraying.

The compositions are particularly suited to coating cooking utensils, for example frying pans, saucepans and bakeware or for oven linings. In making cooking utensils, a blank may be coated and then formed, or an already formed utensil may be coated.

Compositions according to the invention may also be used to form adherent non-stick, low friction, coatings on many other articles including industrial processing equipment including moulds, rollers, stirrers, mixers, chutes, hoppers and heat sealing jaws, domestic articles such as iron sole plates, food mixers and ice separators and tools such as saw blades.

The substrates to which the coating compositions are applied should be clean and free from grease and unless they have a fritted surface are preferably roughened, for example by abrading by grit blasting or by etching. Coatings may be applied by any of the conventional techniques, including spraying, dipping and brushing.

The coating method in which a topcoat not containing an adhesive is applied over a primer coating containing an adhesive according to the invention is suitable for any of these applications.

The preferred compositions of the invention are aqueous compositions made by the use of aqueous dispersions of PTFE prepared by an aqueous polymerisation process for example as described in U.K. patent specification Nos. 689,400 and 821,353.

It should be ensured that a sufficient quantity of a suitable stabiliser is present in any aqueous dispersion of a fluorocarbon polymer used in this invention. Stabilisers found suitable include non-ionic surfactants such as those sold by Rohm and Haas Company of Philadelphia U.S.A., under the trademarks "Triton" DN65 and "Triton" X100. On the other hand it has been found that an anionic surfactant such as sodium lauryl sulphate does not provide adequate stabilisation in the presence of aluminium hydroxychloride.

An advantage of coatings prepared by the method of the present invention is that they do not use chromic acid which has previously been used for preparing fluorocarbon polymer coatings. Chromic acid is known to be toxic and it is clearly desirable to be able to avoid its use in compositions which may be used to coat cookware.

When the composition contains the fluorocarbon polymer dispersed in a liquid medium, the dispersion may be in an aqueous or an organic medium and a dispersion may be made by a polymerisation process in an aqueous or an organic medium or by dispersing a suitably finely divided solid form of the polymer in a liquid medium. In the case of PTFE for example, the polymer may be used in the form of a dispersion obtained from a polymerisation process in aqueous or organic media or a dispersion may be made by comminuting a suitable solid form of PTFE and dispersing it in a liquid, the comminution being effected preferably while the PTFE is suspended in a liquid medium in the presence of a dispersing agent. Lubrication grades of PTFE such as those sold by Imperial Chemical Industries Limited under the Trade Marks L170 and L171 may be used. Sufficient dispersing agent of a suitable kind is used to make a stable dispersion which will remain stable after addition of aluminium hydroxychloride.

The invention will be illustrated with reference to the following examples.

EXAMPLE 1

35.8 g of a commercially available aqueous aluminium hydroxychloride solution (made from an aluminium hydroxychloride (also known as aluminium chlorhydrate) of approximate formula $Al_2(OH)_5Cl.2H_2O$ containing 11.6% w/w aluminium and 8.6% w/w chloride was mixed with 110.9 g of water and added with stirring to 103.3 g of an aqueous PTFE dispersion containing 60.5% w/w PTFE stabilised with 2.5% by weight relative to PTFE of a non-ionic surfactant sold by Rohm and Haas Company of Philadelphia, U.S.A. as Triton DN65 and described by the suppliers as a modified ethoxylated straight chain alcohol. The final mixture thus contained by weight, 25% PTFE and 6.65% aluminium relative to PTFE. The Al:Cl atomic proportions were thus 1:0.56. The primer was sprayed on to an aluminium plaque (previously grit blasted with 60 mesh alumina to give a Permascope reading of 16 $\mu$m). The plaque was then dried and baked at 150°C for 10 minutes. The Permascope reading was then 18 $\mu$m. A conventional pigmented PTFE-containing top coat was then sprayed on, dried for 5 minutes at 80°C and then sintered at 400°C for 10 minutes. The Permascope reading was then 30 $\mu$m. The coating appearance was good. Adhesion was assessed by tests as follows:

1. By cutting through the coating and into the metal with a razor blade to give a cross-hatched pattern of cuts providing approximately 3 mm × 3 mm squares over an area of 625 mm². The adhesion of the coating is then assessed by firmly pressing a length of 25 mm wide, pressure-sensitive, adhesive tape over the cross-hatched area and subsequently pulling the tape sharply backwards at an angle of 45° to the direction of application. The application and stripping of tape over the cross-hatched area is repeated with fresh tape until there is evidence that the coating is detaching from the metal or, if no failure is observed, up to a maximum of 15 times.
2. The cross-hatching procedure of test 1 was repeated and the test plaque was then immersed in a vegetable based cooking oil at 200°C for 8 hours. The adhesive tape test is carried out, after washing the plaque with detergent and drying it, up to a maximum of 15 times.

The results by these tests were excellent, i.e. the coating withstood 15 consecutive applications of tape, both before and after immersing the coated plaque in hot cooking oil as above described. Some details of this and following examples and results of tests relevant to the examples are summarised in the Table.

EXAMPLE 2

To 2.63 g of the commercial aluminium chlorohydrate solution described in Example 1 was added 123.5 g water. This mixture after stirring was added to 26.0 g of a PTFE aqueous dispersion (containing 58.5% by weight of PTFE and stabilised with 2.58% by weight relative to PTFE of Triton DN65 (Trade Mark) surfactant. The mixture was stirred and filtered. It was then tested as a primer as in Example 1 with the one modification that in the second test the plaque was immersed in the oil at 200°C for 3 hours instead of 8 hours.

EXAMPLE 3

This was similar to Example 2, but the ingredients were now 26.3 g of the aluminium chlorohydrate solution, 100 g water and 26.0 g of PTFE dispersion. After filtering the mixture was tested as a primer as in Example 2.

EXAMPLE 4

This was similar to Example 2, but the ingredients were now 10.1 g of the aluminium chlorohydrate solution, 14.4 g water and 100 g of PTFE dispersion. After filtering, the mixture was tested as a primer as in Example 2.

EXAMPLE 5

24.9 g of aluminium chlorohydrate powder (analysing to show 23.5% by weight aluminium and 17.5% by weight of chloride) was mixed with 21.1 g water and the mixture added to 100 g of PTFE dispersion of the type used in Examples 2 to 4. After filtering the mixture was tested as a primer as in Example 2.

EXAMPLE 6

To 140.5 g of an aqueous PTFE dispersion (58.6% w/w PTFE), stabilised with Triton DN65 (2.58% w/w relative to PTFE) was added 144.5 g of water, followed, with stirring, by 45 g of a commercial aluminium chlorohydrate [$Al_2(OH)_5Cl$] solution containing 12.2% by weight aluminium and 8.13% by weight chloride, followed by 3.3 g of an aqueous black pigment paste (consisting of 25% by weight carbon black in water, emulsified with ca 5% by weight on total paste of a polyethoxylated long chain alcohol surfactant). The mixture was then filtered. This mix is similar to that of Example 1 except that pigment is now present. It was tested as in Example 2.

EXAMPLE 7

This was similar to Example 6 but the quantities were now 175 g of PTFE dispersion, 111 g water, 56 g of aluminium chlorohydrate solution and 3.4 g of pigment paste. It was tested as in Example 2.

EXAMPLE 8

This was similar to Example 6 but the quantities were now 249 g of PTFE dispersion, 37 g water, 79 g of aluminium chlorohydrate solution and 3.7 g of pigment paste.

EXAMPLE 13

This mix was similar to Example 11 but now weights were 102.2 g of aqueous PTFE dispersion and 98.0 of aluminium chlorohydrate solution. See table for results.

Table

| Example | % PTFE in final primer (by weight) | % Al in final primer | % (Al) (PTFE) | Permascope readings (micron) Substrate | Permascope readings (micron) With baked primer coat present | Permascope readings (micron) After final sintering of primer and top coat | Adhesive tape test (No. of applications needed to cause grid failure) Before hot oil test | Adhesive tape test (No. of applications needed to cause grid failure) After hot oil test |
|---|---|---|---|---|---|---|---|---|
| 1 | 25.0 | 1.66 | 6.65 | 16 | 18 | 30 | >15 | >15 |
| 2 | 10.0 | 0.20 | 2.00 | 15 | 17 | 30 | 8 | 6 |
| 3 | 10.0 | 2.00 | 20.00 | 15 | 17 | 31 | >15 | >15 |
| 4 | 47.0 | 0.94 | 2.00 | 16 | 18 | 31 | 4 | 3 |
| 5 | 40.0 | 4.00 | 10.00 | 15 | 17 | 29 | 15 | 14 |
| 6 | 24.8 | 1.65 | 6.65 | 15 | 16 | 28 | 15 | 14. |
| 7 | 29.7 | 1.98 | 6.65 | 14 | 16 | 25 | >15 | >15 |
| 8 | 39.6 | 2.63 | 6.65 | 13 | 14 | 25 | >15 | 15 |
| 9 | 30.0 | 2.00 | 6.65 | 15 | 16 | 28 | 15 | 14 |
| 10 | 30.0 | 2.00 | 6.65 | 12 | 14 | 24 | 12 | 8 |
| 11 | 40.0 | 1.60 | 4.00 | 17 | 18 | 30 | 8 | 5 |
| 12 | 30.0 | 4.20 | 14.00 | 16 | 17 | 28 | 12 | 9 |
| 13 | 30.0 | 6.00 | 20.00 | 15 | 17 | 30 | +12 | +6 |

EXAMPLE 9

To 19.6 g of aluminium chlorohydrate solution (as used in Examples 6 – 8) was added 34.3 g water followed by 4.6 g of concentrated hydrochloric acid (SG 1.18, 36% w/w HCl). This mix was poured with stirring into 61.5 g of PTFE dispersion of the type used in Examples 6 to 8. The mix was filtered. It will be seen that the chloride content relative to aluminium is now approximately twice that of earlier examples, i.e. the chlorohydrate is now expressible as $Al_2(OH)_4Cl_2$. The mix was tested as a primer as in Example 2.

EXAMPLE 10

To 19.6 g of aluminum chlorohydrate solution as used in examples 6 to 8 was added, 40.4 g water. The mix was added to 60 g of a PTFE dispersion (containing 60% w/w PTFE) stabilised with 3% by weight relative to PTFE of a surfactant sold by Rohm and Haas Company under the trademark Triton X100 which is an octyl phenol polyethylene oxide condensate. The mix was filtered and tested as a primer as in Example 2.

EXAMPLE 11

To 136.3 g of an aqueous PTFE dispersion (58.7% w/w PTFE) with a number average median particle size of 0.14μ) stabilised by Triton DN65 (2.58% w/w relative to PTFE), were added 37.6 g water, followed with stirring by 26.1 g of a commercial aluminium chlorohydrate [$Al_2(OH)_5Cl$] solution containing 12.24% w/w aluminium and 8.30% w/w chloride. Test results are given in the accompanying table.

EXAMPLE 12

This mix was similar to Example 11 but now the weights were 102.2 g of aqueous PTFE dispersion, 29.2 g water and 68.6 g aluminium chlorohydrate solution. See table for results.

We claim:

1. A method of forming a fluorocarbon polymer-containing coating on a substrate comprising applying to a substrate, an aqueous composition having a polytetrafluoroethylene polymer or copolymer dispersed therein and an aluminum hydroxychloride as an adhesive dissolved therein, and heating the composition on the substrate sufficiently to remove volatile components therefrom and to form a layer on the substrate the weight of the polymer or copolymer having from 10 to 50 grams per 100 grams of composition and weight of aluminum provided by the aluminum hydroxychloride being at least 3 grams per 100 grams of the polymer or copolymer.

2. A method according to claim 1 wherein the weight of aluminum provided by the aluminum hydroxychloride is from 1 to 5 grams per 100 grams of composition.

3. A method according to claim 1 wherein the composition is applied to the substrate to form a layer constituting a primer coat, the layer is heated to dry it and to remove substantially all the volatile components of the layer, and further applying to the primer coat a top coat of an aqueous polytetrafluoroethylene polymer or copolymer dispersion, not including an adhesive and sintering the primer and top coats.

4. Cookware coated by a method according to claim 3.

5. A method according to claim 1 wherein the copolymer is a copolymer of tetrafluoroethylene with up to 15% by weight of other ethylenically unsaturated monomers.

6. A method according to claim 5 wherein the other unsaturated monomers as selected from the group consisting of ethylene, vinyl chloride and hexafluoropropane.

7. An article coated by a method according to claim 1.

8. A method according to claim 1 wherein the aluminum hydroxchloride has the formula $$Al_2(OH)_5Cl \cdot xH_2O$$

where $x$ is approximately 2.

9. A method according to claim 1 wherein the polymer is polytetrafluoroethylene or a copolymer of tetrafluoroethylene with up to 5% by weight of another monomer.

* * * * *